Sept. 14, 1954     G. H. GOLDNER     2,689,295
WELDING APPARATUS
Filed March 13, 1952
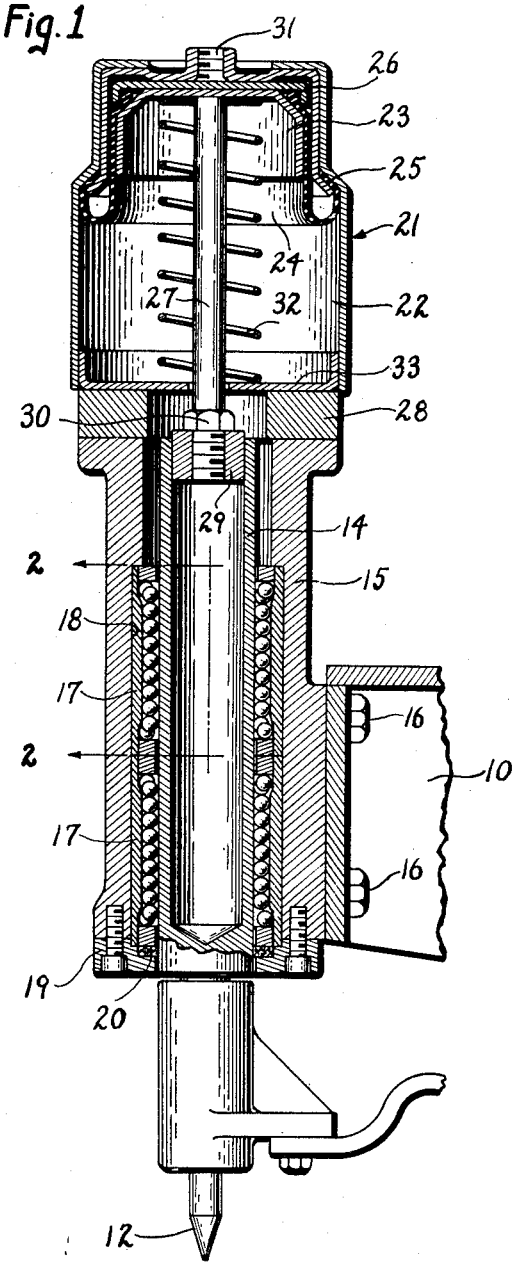
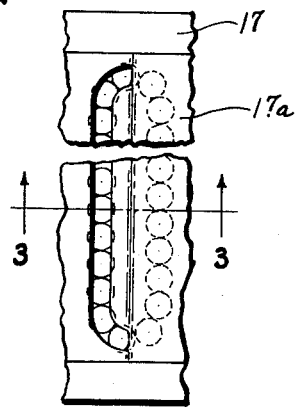
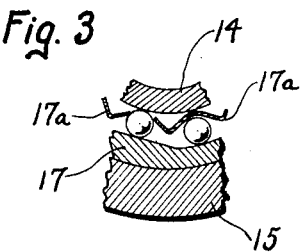
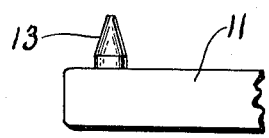
INVENTOR.
GEORGE H. GOLDNER
BY
*Attorney*

Patented Sept. 14, 1954

2,689,295

UNITED STATES PATENT OFFICE 2,689,295

WELDING APPARATUS

George H. Goldner, Warren, Ohio, assignor to Federal Machine and Welder Company, Warren, Ohio, a corporation of Ohio Application March 13, 1952, Serial No. 276,263

1 Claim. (Cl. 219—4)

This invention relates to welding apparatus, more particularly to resistance welding apparatus wherein the work is engaged between welding electrodes during the weld-forming operation, and the principal object of my invention is to provide new and improved apparatus of the class described.

In the art of resistance welding it is common knowledge that one of the major factors causing imperfect welds is the failure of the apparatus to maintain a constant pressure on the weld as the heat produced by the welding current softens the work metal. Since this softening of the work occurs rather abruptly, the movable electrode should instantly follow up the softened metal in order to maintain the welding pressure and produce a sound weld; but, as is often the case, the movable electrode lags behind the softening of the metal and causes a momentary reduction in welding pressure which results in an imperfect weld.

Apparatus of the prior art has either failed to overcome this momentary reduction of welding pressure or has attempted to solve the problem by complicated and expensive means which are often unreliable and require frequent attention. In contrast, my invention provides simple and inexpensive apparatus which produces the desired result in an extremely reliable manner.

The success of my invention may be attributed to the fact that I have accomplished that which the prior art has failed to accomplish, namely, the provision of inexpensive welding apparatus wherein friction and inertia of the parts carrying the movable electrode are reduced to a negligible value. These and other advantages of my invention will become apparent from a study of the description which follows:

In the drawings forming a part of this application, there is shown, for purpose of illustration, an embodiment which my invention may assume, and in this drawing:

Figure 1 is a fragmentary, longitudinal sectional view of welding apparatus embodying my invention, Figure 2 is an enlarged fragmentary view generally corresponding to the line 2—2 of Figure 1, certain parts being removed in the interest of clarity, and Figure 3 is a fragmentary sectional view generally corresponding to the line 3—3 of Figure 2.

Referring to the drawing, it will be seen that my invention is therein shown applied to conventional spot-welding apparatus having upper and lower arms 10 and 11. The arms 10 and 11 are secured to and extend outwardly of a housing or pedestal (not shown), and such housing may contain the usual transformer, controls and other associated parts well known in the art. As illustrated, the upper and lower arms 10 and 11 provide support for respective upper and lower welding electrodes 12 and 13.

As in conventional apparatus, the lower electrode 13 is carried by the lower arm 11 and the upper electrode 12 is carried by a slide which permits the upper electrode to be moved toward the lower electrode so as to engage the work therebetween.

In the embodiment illustrated, I provide a cylindrical slide 14 which combines lightness with strength. This slide 14 is reciprocable within a slide housing 15, and the housing 15 may be secured to the upper arm 11 by any convenient means, bolts 16 presently being used to effect such securement.

In order to reduce to a minimum the friction between the reciprocable slide 14 and its housing 15, linear ball bearings 17 are interposed therebetween, and as shown in Figure 1 two sets of such bearings, positioned end-to-end, are preferably used to provide a relatively long bearing support. These ball bearings are of the recirculating type and each comprises a plurality of circuits or tracks filled with balls. As shown in Figure 2, each track has the general configuration of a flattened oval and is so constructed that the balls on one side of the track may contact the slide while the balls on the other side of the track are guided away from the slide by means of a ball retainer 17a. This construction permits the balls to circulate around their respective tracks as the slide 14 is reciprocated.

As shown in Figure 1, the housing 15 has an enlarged bore 18 into which the sets of bearings 17 may be pressed. An end cap 19, apertured to pass the slide 14, is bolted to the housing 15 to secure the bearings 17 in place. A seal 20 is presently carried by the cap 19 to protect the bearings 17 from the entrance of foreign material and to prevent loss of lubricant therefrom.

The means employed to effect movement of the slide 14 and its attached electrode 12 in a direction to apply welding pressure is shown to comprise a fluid motor 21 of the rolling diaphragm type. This fluid motor is secured to a ring-like spacer 28 and the spacer is in turn secured to the top of the housing 15. The fluid motor 21 comprises a cylinder 22, a piston 23, and a flexible, fluid-tight diaphragm 24. The size of the piston 23 is such that clearance is always provided between the piston and the cylinder, the seal between these two relatively movable parts being provided by the rolling diaphragm 24 which is secured to the cylinder at 25 and to the piston at 26.

A piston rod 27 is secured to the piston 23 and extends downwardly therefrom and outwardly of the cylinder. The free end of the piston rod is threaded to a plug 29 secured to the upper end of the slide 14, and a lock-nut 30 secures the piston 27 and the slide 14 against unintentional separation.

A port 31 is provided as shown for connection of the fluid motor to a source of fluid pressure, and a spring 32 is interposed between the piston 23 and a lower end wall 33 of the motor to yieldably hold the piston and its attached parts in the retracted position illustrated.

The operation of my improved welding apparatus is as follows: The work to be welded is first placed between the upper and lower electrodes. Then the usual foot operated valve, or the like, may be shifted so as to admit fluid under pressure to the top of the piston 23. The piston 23 will then move downwardly until the work has been firmly clamped between the two electrodes. Welding current may then be caused to flow between the electrodes by means well-known in the art. Upon completion of the weld, the fluid pressure above the piston 23 may be vented to exhaust and the spring 32 will then return the parts to the position illustrated in Figure 1.

During the above recited welding cycle, and as the work metal softens under the heat produced by the welding current, the pressure in the cylinder 21 will cause the slide to closely follow-up the weld by advancing the upper electrode 12 so as to maintain proper welding pressure upon the work and produce a sound weld. This follow-up takes place immediately since, as before described, friction opposing movement of the slide has been virtually eliminated by the provision of linear bearings; friction in the fluid motor is eliminated since the relatively movable parts do not slide upon one another; and inertia of the movable parts has been minimized by the elimination of the conventional heavy piston and by the use of the light-weight yet strong construction of the slide 14.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

A movable electrode assembly for a low-inertia resistance welding machine having quick weld follow-up characteristics, comprising an elongated housing having a longitudinal opening therethrough, a reciprocable slide member housed within said opening and carrying a movable electrode extending from one end of said housing, said slide member having a transverse size less than that of said opening, a plurality of rollable members spaced radially about and also spaced longitudinally of said slide member and having rolling contact therewith, said rollable members maintaining said slide member in axial position relative to said housing and providing for antifriction axial reciprocation of said slide member within said housing opening, a cylinder mounted on the end of said housing opposed to said electrode and having an aperture for introducing fluid pressure thereinto, a lightweight piston disposed within said cylinder and connected to said slide member, said piston having a diameter less than that of said cylinder to eliminate frictional contact between the opposing walls thereof, and a flexible diaphragm connected at its opposite ends to said piston and cylinder respectively so that fluid pressure entering said cylinder will move said piston and slide member in a direction toward the work to be welded with a minimum of resistance, whereby the end of the movable electrode will follow up the receding work surface as such surface softens under the heat generated by the welding current.

References Cited in the file of this patent

UNITED STATES PATENTS

| Number | Name | Date |
|--------|------|------|
| 368,089 | Hinds | Aug. 9, 1887 |
| 2,465,456 | Johnson | Mar. 29, 1949 |
| 2,503,009 | Thompson | Apr. 4, 1950 |